Figure 1:
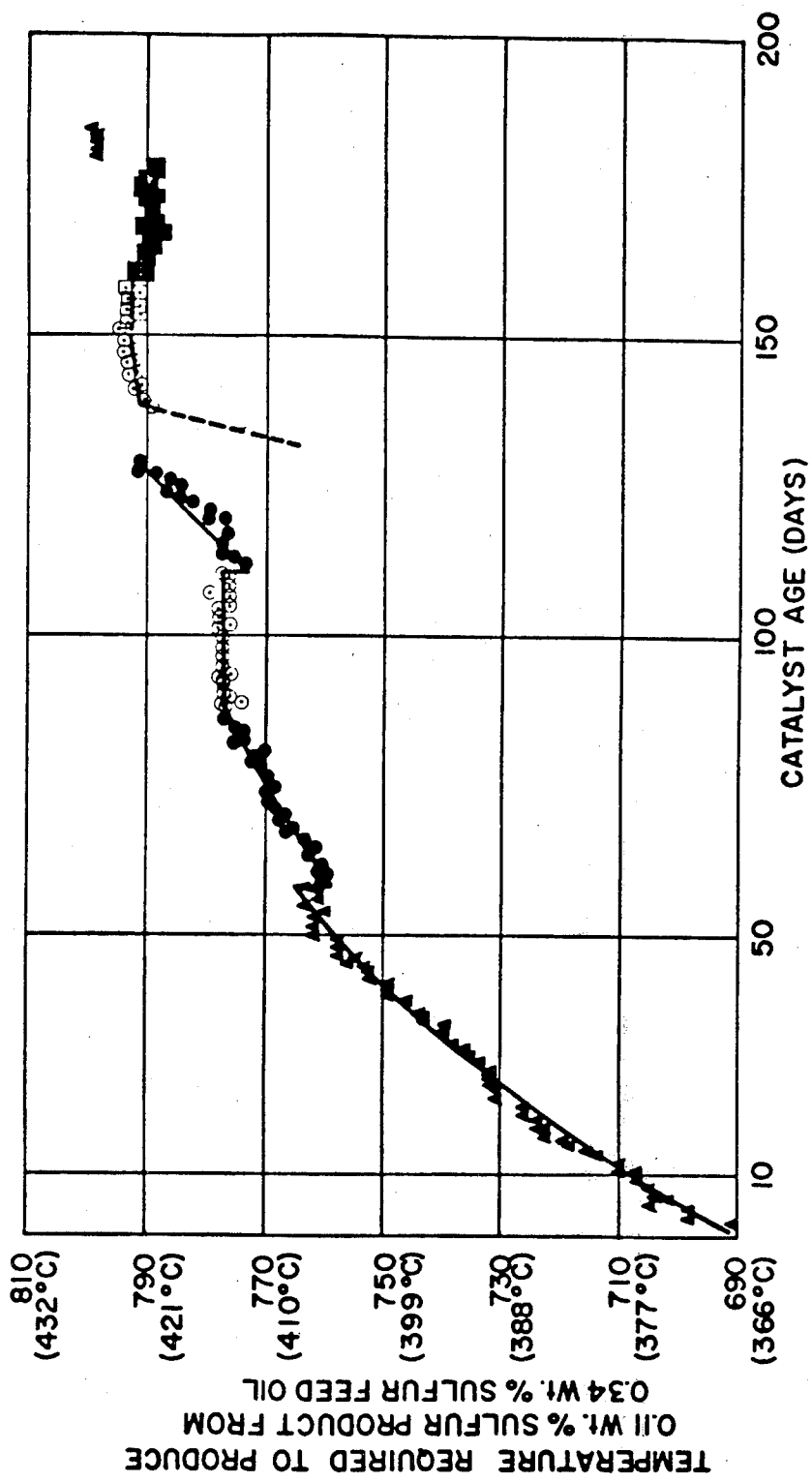

United States Patent [19]
Bonnell et al.

[11] 4,017,382
[45] Apr. 12, 1977

[54] HYDRODESULFURIZATION PROCESS WITH UPSTAGED REACTOR ZONES

[75] Inventors: William S. Bonnell, Mt. Lebanon; Robert D. Christman, Pittsburgh; Jordan S. Lasher, Pittsburgh; John A. Paraskos, Pittsburgh; Stephen J. Yanik, Valencia, all of Pa.

[73] Assignee: Gulf Research & Development Company, Pittsburgh, Pa.

[22] Filed: Nov. 17, 1975

[21] Appl. No.: 632,374

[52] U.S. Cl. ............................................. 208/210
[51] Int. Cl.² ..................................... C10G 23/02
[58] Field of Search .......... 208/216, 210, 211, 212, 208/305

[56] References Cited
UNITED STATES PATENTS

| | | | |
|---|---|---|---|
| 2,906,784 | 9/1959 | Dean et al. ........................ | 208/211 |
| 3,591,489 | 7/1971 | Adams et al. ..................... | 208/211 |
| 3,598,535 | 8/1971 | Wennerberg ...................... | 208/212 |
| 3,795,607 | 3/1974 | Adams et al. ..................... | 208/210 |
| 3,809,644 | 5/1974 | Johnson et al. ................... | 208/210 |

*Primary Examiner*—George Crasanakis

[57] ABSTRACT

A process for the hydrodesulfurization of residual oil in a plurality of catalyst zones in series with the upstream reactor being removed periodically for a catalyst change. When an upstream zone is taken off-stream for a catalyst change, the fresh feed oil is passed to a succeeding downstream zone so that the downstream catalyst zone is upstaged to the status of an upstream catalyst zone. When a zone is returned to service after a catalyst change, it enters the process as a downstream reactor in the series.

5 Claims, 5 Drawing Figures

HYDRODESULFURIZATION PROCESS WITH UPSTAGED REACTOR ZONES

This invention relates to a multi-reactor process for the hydrosulfurization of metal- and sulfur-containing asphaltentic heavy oils.

The reactors of the present process are arranged in series in a continuous loop, with individual reactors being removed periodically for a catalyst change. When an upstream reactor is taken off-stream for a catalyst change, the fresh feed oil is passed to a succeeding downstream reactor so that the downstream reactor is automatically advanced to the status of an upstream reactor. When a reactor is returned to service after a catalyst change, it enters the process as a downstream reactor in the series.

Each reactor of the present process employs a supported Group VI-B and Group VIII metal hydrodesulfurization catalyst. One or more metals from other groups can also be present, such as titanium. Suitable Group VI-B and Group VIII metal combinations include cobalt-molybdenum, nickel-tungsten and nickel-molybdenum. A preferred combination is nickel-cobalt-molybdenum. The catalyst can comprise 5 to 30 weight percent, generally, and 8 to 20 weight percent, preferably, of Group VI and Group VIII metals. The remainder of the catalyst generally comprises a highly porous, non-cracking supporting material. Alumina is the preferred supporting material but other porous non-cracking supports can be employed, such as silica-alumina and silica-magnesia. Preferably all or a large proportion of the catalyst particles have a diameter between about 0.025 and 0.05 inch (0.0635 to 0.127 cm), and can be in any suitable shape, such as extrudates, granules or spheres. The diameter of a catalyst particle is defined as the smallest surface to surface dimension extending through the center or axis of the particle.

In the present process, the feed oil flows downwardly in each reactor through a fixed bed of stationary catalyst particles and the series of reactors removes 60, 70, 80 or more weight percent of the feed metals and sulfur from the oil. Very little hydrocracking occurs in the process. Most of the product oil boils above the initial boiling point of the feed oil, generally, and preferably at least 70, 80 or 90 percent of the total product boils above the IBP of the feed oil to the first stage.

The hydrodesulfurization process employs a hydrogen partial pressure of 500 to 5,000 pounds per square inch gauge (35 to 350 kg/cm$^2$), generally, 1,000 to 3,000 pounds per square inch (70 to 210 kg/cm$^2$), preferably, and 1,500 to 2,500 pounds per square inch (105 to 175 kg/cm$^2$), most preferably.

The gas circulation rate can be between 1,000 and 20,000 standard cubic feet per barrel of oil (17.8 and 356 SCM/100L), generally, or preferably about 2,000 to 10,000 standard cubic feet per barrel of oil (35.6 to 178 SCM/100L). The gas circulated preferably contains 80 percent or more of hydrogen. The mol ratio of hydrogen to oil can be between about 4:1 and 80:1. Reactor temperatures can vary between about 600° and 900° F. (316° and 482° C.), generally, and between 650° and 800° F. (343° and 427° C.), preferably. Reactor temperatures are increased during a catalyst cycle to compensate for activity aging loss until a reactor constraint temperature is reached, at which time the catalyst is considered deactivated. The temperature should be sufficiently low so that not more than 30 percent, generally, and preferably not more than about 10, 15 or 20 percent of the 650° F.+ (343° C.+) feed oil will be cracked to material boiling below 650° F. (343° C.). The liquid hourly space velocity in each reactor can be between about 0.1 and 10, generally, and preferably, between about 0.2 and 1 or 1.25 volumes of oil per hour per volume of catalyst.

The fresh feed to the process of this invention can be a full petroleum crude or a reduced crude containing substantially all of the residual asphaltenes of the full crude. The process is also useful for desulfurizing and demetallizing other asphaltene-containing oils, such as coal liquids and oils extracted from shale and tar sands. Asphaltenes have a relatively low molecular hydrogen to carbon ratio and will generally comprise less than about 10 percent of the feed oil, but will generally contain most of the metallic components present in the total feed, such as nickel and vanadium.

Petroleum atmospheric or vacuum tower residua contain substantially the entire asphaltene fraction of the crude from which they are derived and therefore contain 95 to 99 weight percent or more of the nickel and vanadium content of the full crude. The nickel, vanadium and sulfur content of petroleum residua can vary over a wide range. For example, nickel and vanadium can comprise 0.002 to 0.03 weight percent (20 to 300 parts per million) or more of the residua, while sulfur can comprise about 2 to 7 weight percent, or more, of the residua.

The desulfurization catalysts have a high activity for demetallization as well as for desulfurization and the catalyst removes most of the nickel and vanadium from the feed oil stock as well as most of the sulfur. These metals deposit heavily on the outermost regions of the catalyst particles and tend to inhibit access to catalyst pores, thereby reducing the desulfurization activity of the catalyst. Upon blockage of the pores, the aging rate of the catalyst ceases to be gradual and increases abruptly to terminate the catalyst cycle. Therefore, removed nickel and vanadium generally account for the ultimate deactivation of first stage desulfurization catalysts, while coke deposition during removal of sulfur and nitrogen contributes relatively little to catalyst deactivation in the first stage.

While in the first reactor stage the primary cause of catalyst deactivation is metals deposition on the catalyst, in the second and subsequent stages the primary cause of catalyst deactivation is coking. Desulfurization severity is inherently greater in the second and subsequent stages than in the first stage, and it is known that catalyst coking increases with desulfurization severity. Catalyst coking occurs so extensively in a second hydrodesulfurization stage that the second stage aging rate is considerably more rapid than the first stage aging rate. This high second stage coking phenomenon can probably be explained at least in part on a molecular basis. In the first stage, the existence of peripheral alkyl groups on feed asphaltene and resin molecules provides steric hindrance which tends to prevent contact of the polycondensed ring inner body of asphaltene molecules with the catalyst. However, the most refractory sulfur in the asphaltene molecules is not removed in the first stage and must be removed in a second stage. This sulfur is more refractory because it tends to be deeply imbedded in the aromatic nucleus. Following the elimination of some of the alkyl groups in the first stage, the molecules entering the second stage are sterically better adapted to permit the aromatic nucleus to abut broadly against catalyst sites exposing the hydrogen and carbon atoms and ultimately the imbedded sulfur more intimately to the catalyst surface, thereby inducing coking. This mechanism probably accounts for the enhanced catalyst coking and higher aging rates in the second stage, as compared to the first stage.

Figure 2:
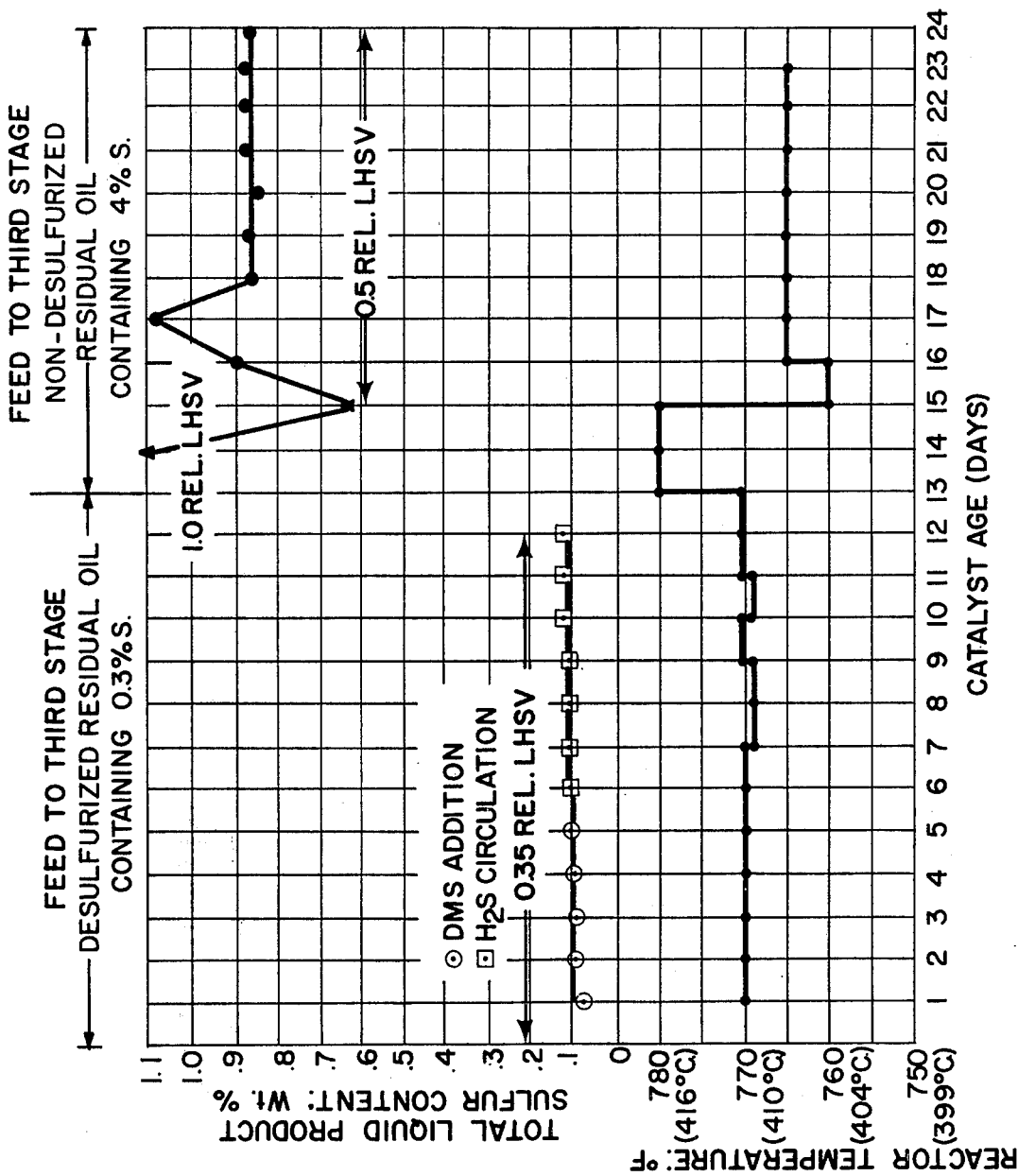
Figure 3:
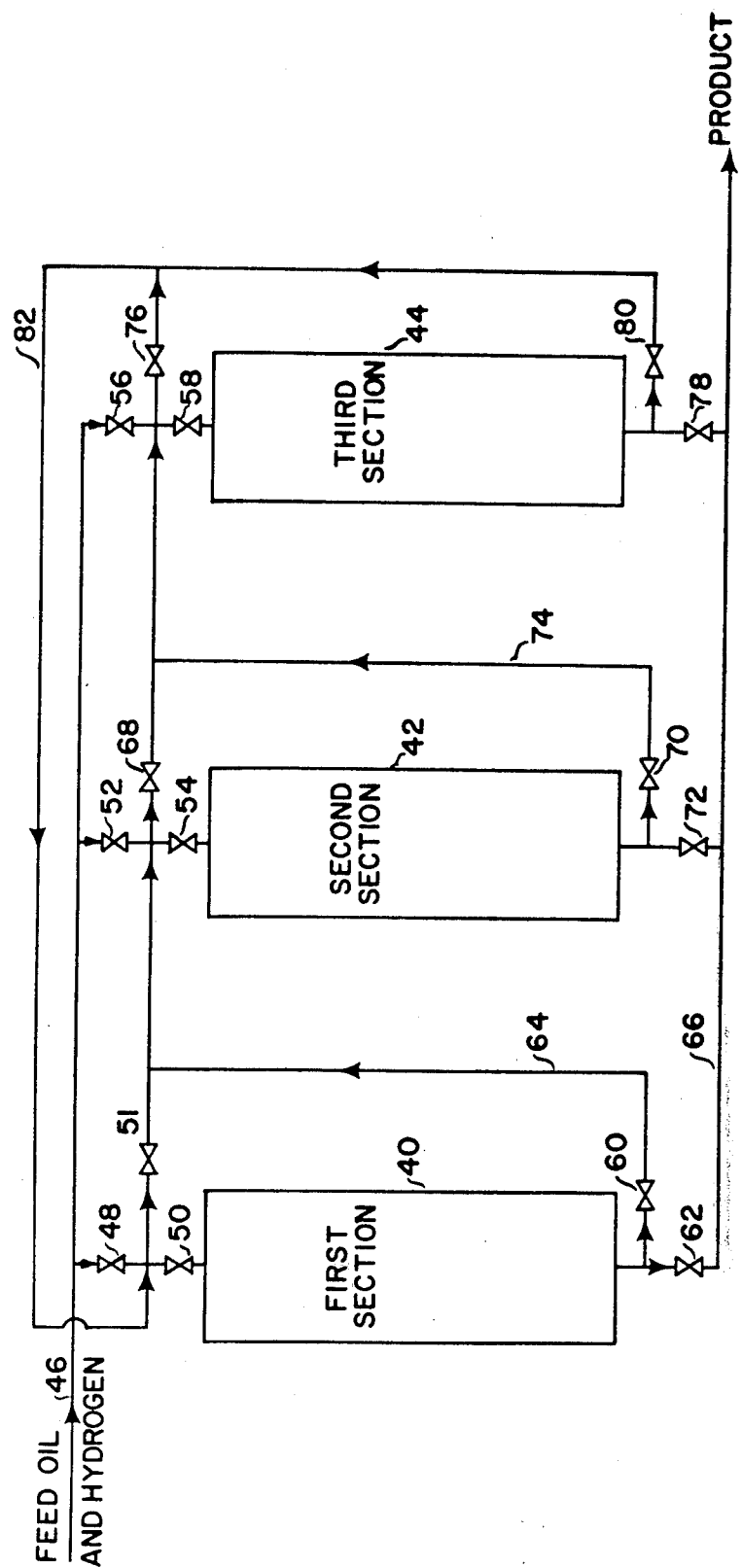

FIGS. 1, 2, 3 and 4 are presented to illustrate the present invention. FIGS. 1 and 2 present catalyst aging curves while FIGS. 3 and 4 present process schemes for performing the invention.

FIG. 1 presents in detail a late stage petroleum residual oil hydrodesulfurization aging curve, specifically a third stage aging curve, using a nickel-cobalt-molybdenum catalyst. In the test illustrated in FIG. 1, although there was a flash step between the first and second stages, there was no flash step between the second and third stages. The stage represented in the data of FIG. 1 produced a product containing 0.11 weight percent sulfur from an effluent from a second stage containing 0.34 weight percent sulfur at 1850 psi (130 kg/cm$^2$) hydrogen pressure and 5,000 SCF/B (89 SCM/100L) of a stream containing 85 percent hydrogen. As shown in FIG. 1, due to rapid catalyst aging and rapid approach of the 790° F. (421° C.) reactor constraint temperature, process severity required incremental amelioration in order to keep the reactor in operation until earlier stages also reached the constraint temperature, as indicated by step-wise reductions in relative space velocity from 0.55 to 0.50, to 0.45 and to 0.40, while sulfur compounds were added in all but the first two space velocity intervals in FIG. 1 to maintain the catalyst in a sulfided condition in the face of the low quantity of sulfur removed in the reactor. FIG. 1 shows that at the end of the aging period a relative space velocity of 0.50 was attempted, but at this space velocity at the last period in the catalyst cycle the constraint temperature had to be exceeded in order to achieve the desired product sulfur level. Such a situation ordinarily requires termination of the catalyst cycle.

FIG. 2 represents an extension of the aging curve of FIG. 1. In order to attempt an extension of the life of the third stage catalyst, the relative liquid hourly space velocity was lowered drastically to 0.35 and dimethyl sulfide or hydrogen sulfide was added, permitting production of a 0.1 weight percent sulfur product at only 770° F. (371° C.). However, this relative space velocity was totally inadequate for processing a volume of oil as would be required with the reactor in series with earlier reactor stages. Thereupon, a fresh non-desulfurized petroleum residual oil stream containing 4 weight percent sulfur which had constituted the feed to the first desulfurization stage was charged directly to the third stage. Initially, the non-desulfurized stream was introduced at a relative LHSV of 1.0, and a product sulfur level of 1.1 was obtained at 780° F. (416° C.). Since this temperature is close to the 790° F. (421° C.) constraint temperature, the relative LHSV was lowered to 0.5 and a product containing 0.86 percent sulfur was obtained at a reactor temperature of only 760° F. (404° C.). In this manner, the third stage reactor, after it was completely deactivated for third stage purposes, was found to be capable of desulfurizing the full flow rate of oil that had been charged to the first stage to obtain a product sulfur level of less than the 1 percent sulfur level obtained from the first stage with the same feed. Furthermore, FIG. 2 shows that at a steady temperature of 765° F. (407° C.), which is well below the 790° F. (421° C.) metallurgical constraint temperature of the reactor, this surprising result is achieved with no catalyst aging during the period of the test, even though the catalyst had previously been completely coke deactivated for purposes of standard third stage operation.

A possible theory relating to the data of FIG. 2 is that passage of fresh feed residual oil over a coke-deactivated catalyst in a downstream reactor induces a reduction of the equilibrium coke level on the downstream deactivated catalyst, even though there is no intervention of an oxidation or other type of catalyst regeneration step.

The present invention embodies a process to take advantage of the catalyst life extension effect of fresh feed residual oil on a downstream catalyst. In addition, the present process tends to equalize metals deposition on all segments of the catalyst in a system. These advantages are accomplished by employing a continuous series of reactors and progressively upstaging downstream reactors into upstream reactors.

A process scheme of the present process is illustrated in FIG. 3. The multiple reactors of FIG. 3 each contain a fixed bed of stationary catalyst particles. Each reactor section can be considered to constitute a segment of a single reactor zone because the entire effluent from a preceding stage is passed to its subsequent stage without an intervening flashing step for removal of hydrogen sulfide and ammonia. Each section can employ the same or a different catalyst.

In the process of FIG. 3, the catalyst is segregated into sections in a manner permitting any section or sections to be out of service upon deactivation of its catalyst to permit a catalyst refill operation without interruption of the series flow through the sections remaining on-stream. This function provides the substantial advantage that each time an upstream reactor section is removed from service due to catalyst deactivation, as indicated by a progressive reactor temperature increase to a constraint temperature, to permit refill with fresh catalyst, the fresh feed oil is charged to the succeeding downstream reactor section. Thereby, each reactor section will be sequentially upgraded from a downstream to an upstream reactor section, followed by removal from service for refill with fresh catalyst and for catalyst sulfiding during which time the reactor is by-passed until it is subsequently returned to service with fresh catalyst as a downstream reactor. In this manner, the reactor sections are effectively utilized in a continuous, closed cycle or loop. Each downstream reactor will sequentially be used as a final, intermediate and initial reactor in a series, relative to fresh feed flow. The reactor sections are thereby subjected to an equalized metals loading effect by the feed residual oil and are exposed to fresh feed oil after being employed for desulfurizing a previously treated oil. The deactivated catalyst when removed from any section will possess a greater and more uniform loading of metals throughout its bed than if the catalyst in all the sections had been combined into a single reactor, in contrast to the plurality of reactors shown.

Referring to FIG. 3, the catalyst is disposed as fixed beds in three sections; first section 40, second section 42 and third section 44. The fresh feed residual oil and hydrogen are supplied through line 46. When the feed oil is being supplied to first reactor section 40, the pair of valves 48 and 50 are opened and valve 51 is closed, while valves 52 and 56 to sections 42 and 44, respectively, are closed. First section effluent is passed to the second section by opening valve 60 and closing valve 62. In this manner, first stage effluent enters line 64 leading to the second section, rather than to produce line 66. As shown in FIG. 3, the entire effluent from each stage is passed to the succeeding series stage without any interstage flashing step to remove product gases, such as ammonia and hydrogen sulfide.

The first stage effluent in line 64 is charged to second section 42 by opening valve 54 and closing valves 52 and 68. When third section 44 is down for a catalyst change, second section effluent is removed from the process as product through line 66 by opening valve 72 and closing valve 70.

As the process cycle progresses, third section 44 is returned onstream following a catalyst change and first section 40 is taken off-stream for a catalyst change. First section 40 is sealed from the process by closing valves 48, 50, 60 and 62. Fresh feed oil and hydrogen in line 46 is now charged directly to second reactor section 42 by opening valves 52 and 54 and closing valves 68 and 56. The second section effluent is no longer the product of the process so valve 72 is closed and valve 70 is opened, permitting second section effluent to flow to third section 44 through line 74. The stream in line 74 can enter the third section by closing valves 76 and 56 and opening valve 58. The third section effluent is now the product of the process and is removed from the process through line 66 by opening valve 78 and closing valve 80.

In the next step of the operational sequence, first section 40 is returned on-stream with fresh catalyst and second section 42 is removed from the process for a catalyst change. This is accomplished by sealing second section 42 from the process by closing valves 52, 54, 70 and 72. Valve 48 remains closed and valves 56 and 58 are opened to permit fresh feed oil and hydrogen to enter third reactor section 44. The third section effluent is passed to first section 40 through line 82 by closing valve 78 and opening valve 80.

The third section effluent enters first section 40 by closing valves 48 and 51, and opening valve 50. The effluent from first section 40 is now the product of the process and enters product line 66 by closing valve 60 and opening valve 62.

In this manner, the process sequence of FIG. 3 can be continued indefinitely, with each downstream reactor chamber being sequentially a downstream reactor, an upstream reactor and a down reactor. Also, the process of FIG. 3 can comprise 4 or more reactor sections, with each downstream reactor chamber being in sequence a downstream, an intermediate and an upstream reactor, vis-a-vis the fresh feed oil. But no matter how many reactors are employed, in the process scheme of FIG. 3 one reactor chamber can be down at all times for a catalyst change, although a different reactor will be down at different times in the catalyst cycle for this purpose. The process is operated continuously and uninterruptedly employing those reactors whose catalyst is not being refilled. Therefore, there need never be an interruption of flow of feed oil to the process of FIG. 3.

Figure 4B:
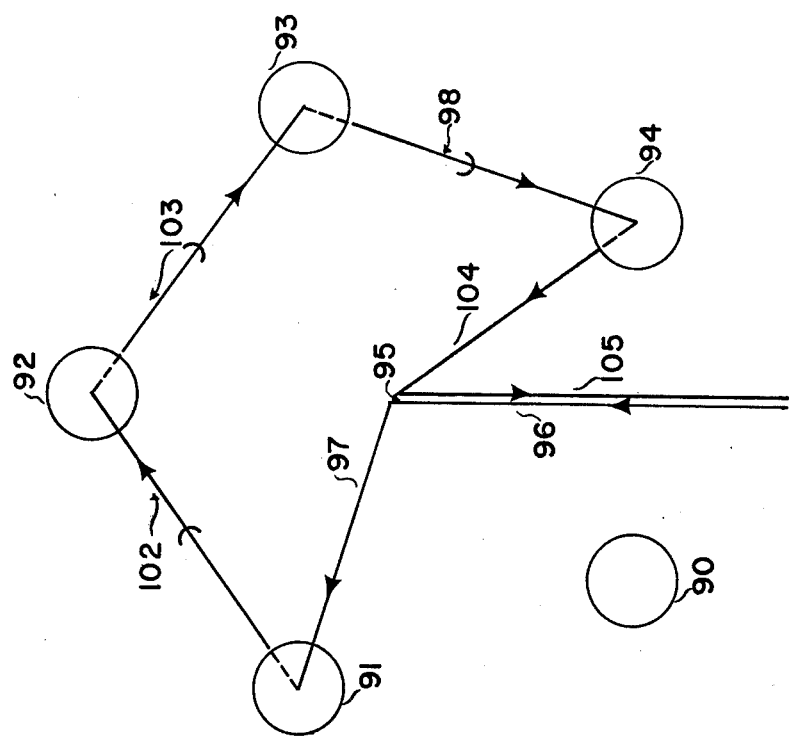
Figure 4A:
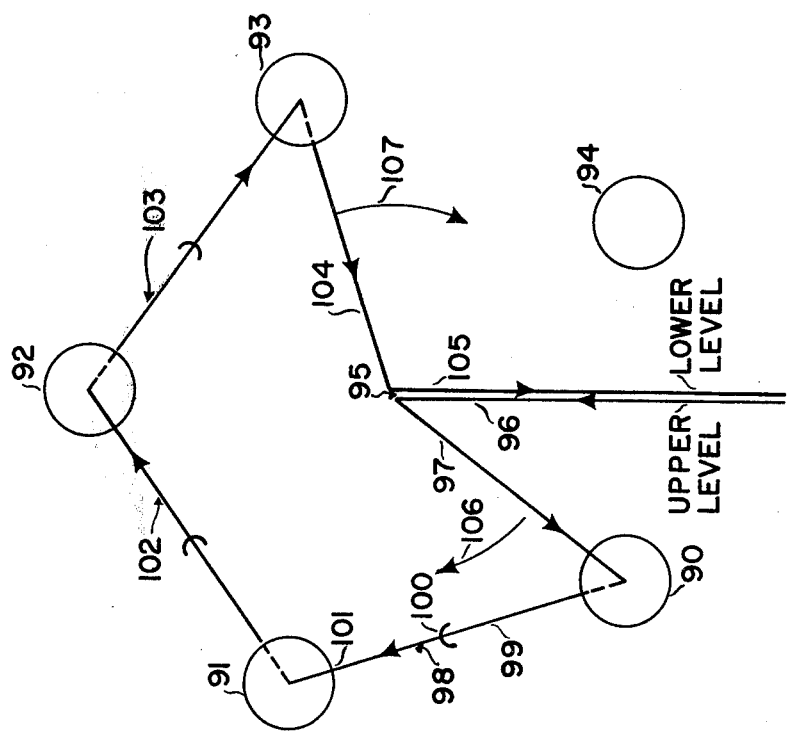

A preferred reactor arrangement for practicing the present invention is illustrated in FIGS. 4A and 4B wherein five reactors are shown symetrically disposed in series in a circular arrangement. In the arrangement shown, four reactors are on-stream and one reactor is off-stream at all times. However, the system illustrated applies generally to the use of three or more reactors disposed equidistantly with each centered on the locus of a circle and with two or more adjacent reactors in series operation at all times. The lead reactor in a series is fed from a lead reactor conduit extending radially from a position at the center of the circle while the end reactor of a series discharges into a discharge conduit extending radially to the center of the circle but terminating at a different vertical position at the center. The advantage of the reactor arrangement of FIGS. 4A and 4B, in comparison to the arrangement of FIG. 3, is that piping is simplified and no valves are required. The absence of valves is highly advantageous at the high pressures required in a residual oil hydrodesulfurization process.

Any of the circularly arranged reactors of FIGS. 4A and 4B can be removed from series flow for catalyst refill. Because the reactors are symetrically arranged with respect to each other in a circle, and because the series of reactors is fed from and discharges to the center of the circle, the same piping can be employed no matter which reactor is removed from or added to the series. Therefore, in removing a reactor from the series and returning another reactor to the series, by temporarily shutting down flow existing piping can be disconnected and rearranged without opening, closing or utilizing any valves.

Each of the five reactors shown in FIGS. 4A and 4B contains a single bed of catalyst and the oil stream passes downwardly through a fixed catalyst bed in each reactor. Although not indicated in the drawings, quench hydrogen is not added directly to the reactors but is injected into the lines between the reactors. The system of FIGS. 4A and 4B is highly suited for hydrodesulfurization of a vacuum tower bottoms because a VTB stream commonly has such a high concentration of sulfur that the resulting total heat of the hydrodesulfurization reaction requires a plurality of widely separated beds to provide an adequate quenching zone between the beds. Therefore, the system of FIGS. 4A and 4B incorporates separated mono-bed reactors with hydrogen quenching between the reactors.

The system of FIGS. 4A and 4B is adapted for routine phased catalyst replacement with only a small reactor system downtime. For example, if the total cycle life for all the catalyst in the five reactors is 170 days, every 34 days the system can be routinely shut down for a short interval during which time the lead reactor can be taken off-stream and at the same time a fresh end reactor inserted into the system. Deactivated catalyst can be conveniently removed, replaced by fresh catalyst and the fresh catalyst sulfided in the down reactor in less than 34 days, so that the removed reactor is ready to return on-stream as an end reactor in the series before lapse of a subsequent 34 day interval. In this manner, the number of monobed reactors can be established so that the time of each on-stream period between phased downtimes is about the same as or only slightly larger than the time required for replacement and sulfiding of the catalyst in the removed reactor.

FIGS. 4A and 4B each show the same reactors and the same conduits, but in a different arrangement. Referring first to FIG. 4A, reactors 90, 91, 92, 93 and 94 are disposed equidistantly with respect to each other on the locus of a circle whose center is indicated at 95. Feed VTB or ATB, after being preheated in a furnace, not shown, is introduced to position 95 through an upper level line 96 which extends to an upper level at center point 95. Radial inlet or feed conduit means 97 extends from the upper level at center 95 to the top of reactor 90.

The bottom of reactor 90 is connected to the top of reactor 91 by a disconnectable conduit unit 98 including lower level horizontal line 99 extending from the bottom of reactor 90, a vertical line indicated by elbow 100 and an upper level horizontal line 101 extending to the top of reactor 91. Identically sized conduit units 102 and 103 connect the other reactors in the same manner. Radial lower level horizontal discharge line 104 extends between the bottom of end reactors 93 to a lower level at the center point 95 where it connects with product removal line 105.

In the arrangement of FIG. 4A, reactors 90, 91, 92 and 93 are operational in series, while reactor 94 is the down reactor. When the catalyst in lead reactor 90 becomes deactivated, reactor 90 becomes the down reactor and reactor 94 is returned on-stream as the end reactor of the series. A comparison of FIGS. 4A and 4B will illustrate the conduit manipulation to accomplish this change.

The change is accomplished by temporarily shutting down the system and then swinging radial inlet conduit 97 on an upper level pivot, such as a bolted flange at center point 95, along arc 106 from the top of reactor 90 as shown in FIG. 4A to the top of reactor 91 as shown in FIG. 4B. Radial outlet conduit 104 is then swung on a lower level pivot, such as a bolted flange at center point 95, from the bottom of reactor 93 as shown in FIG. 4A to the bottom of reactor 94 as shown in FIG. 4B. Conduit 97 can be swung at pivot point 95 by merely unbolting and rotating the flange connection between conduits 96 and 97 and then rebolting the flange after rotation, while conduit 104 can be swung at pivot point 95 by similarly unbolting, rotating and rebolting the flange connection between conduits 104 and 105.

The only other piping change required to convert from the piping arrangement of FIG. 4A to that of FIG. 4B is to remove conduit unit 98 between lead reactors 90 and 91 as shown in FIG. 4A and insert it between end reactors 93 and 94 as shown in FIG. 4B. Conduit units 102 and 103 remain in their former positions during this particular reactor change. Reactor 90 is now isolated for catalyst refill and fresh catalyst sulfiding, while reactor 94 which already contains fresh catalyst is placed on-stream.

It is seen that the change in reactor arrangement from that of FIG. 4A to that of FIG. 4B is accomplished without opening or closing any valves and without cutting or fitting any new piping or discarding existing piping. The convenience of this manipulation is rendered possible because all reactors are disposed equidistantly from each other on the locus of a circle and are fed from and discharge to the center of the circle.

We claim:

1. A process for the hydrodesulfurization of a metal- and sulfur-containing asphaltenic feed oil comprising (a) passing said oil and hydrogen downwardly through at least three fixed bed catalytic hydrodesulfurization zones connected in series so the reaction effluent from each of said zones is passed downwardly through the next zone in said series; (b) the hydrodesulfurization reaction in said zones being conducted at a temperature of 600° to 900° F., a hydrogen pressure of 500 to 5,000 psi, and with a catalyst in each of said zones comprising supported Group VI-B and Group VIII metals; (c) said feed oil being charged directly to one of said series zones, the zone receiving said feed oil constituting the upstream zone in the series, the reaction effluent from said upstream zone being passed downwardly through the first succeeding downstream zone and the reaction effluent from said first succeeding downstream zone being passed downwardly through the second succeeding downstream zone; (d) removing the upstream zone from service upon catalyst deactivation therein and charging said feed oil directly to said first succeeding downstream zone, (e) removing deactivated catalyst from and charging fresh catalyst to said removed upstream zone, (f) subsequently removing said first succeeding catalyst zone from service upon catalyst deactivation therein, returning said upstream zone containing fresh catalyst to said series as the final zone receiving said reaction effluent in said series, and charging said feed oil directly to said second succeeding downstream zone, (g) removing deactivated catalyst from and charging fresh catalyst to said removed first succeeding zone so that said first succeeding catalyst zone is being subsequently returned to said series as the final zone receiving said reaction effluent in said series, and (h) continuing said sequence so that each downstream zone becomes in succession an upstream zone and upon catalyst deactivation is removed from said series for catalyst replacement and subsequent return to said series as the final zone receiving said reaction effluent in the series.

2. The process of claim 1 wherein said feed oil is a vacuum tower bottoms.

3. The process of claim 1 including three zones in series.

4. The process of claim 1 including four or more zones in series.

5. The process of claim 1 wherein said zones are disposed in a circular arrangement.

* * * * *